(12) United States Patent
Yang et al.

(10) Patent No.: US 10,986,533 B2
(45) Date of Patent: Apr. 20, 2021

(54) RADIO ACCESS NETWORK SLICE CONSTRUCTION METHOD AND APPARATUS

(71) Applicant: ZTE CORPORATION, Guangdong (CN)

(72) Inventors: Li Yang, Shenzhen (CN); He Huang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 256 days.

(21) Appl. No.: 16/328,438

(22) PCT Filed: Aug. 1, 2017

(86) PCT No.: PCT/CN2017/095506
§ 371 (c)(1),
(2) Date: Feb. 26, 2019

(87) PCT Pub. No.: WO2018/036350
PCT Pub. Date: Mar. 1, 2018

(65) Prior Publication Data
US 2020/0413290 A1    Dec. 31, 2020

(30) Foreign Application Priority Data
Aug. 26, 2016 (CN) .......................... 201610740961.5

(51) Int. Cl.
*H04W 28/06* (2009.01)
*H04W 28/02* (2009.01)

(52) U.S. Cl.
CPC ....... *H04W 28/06* (2013.01); *H04W 28/0289* (2013.01)

(58) Field of Classification Search
None
See application file for complete search history.

(56) References Cited

U.S. PATENT DOCUMENTS

2015/0271681 A1    9/2015  Perez et al.
2015/0358829 A1*  12/2015  Arnott ................... H04W 72/06
                                                              455/454

(Continued)

FOREIGN PATENT DOCUMENTS

CN    104639653 A    5/2015
CN    104955172 A    9/2015

(Continued)

OTHER PUBLICATIONS

International Search Report and Written Opinion for International Appl. No. PCT/CN2017/095506, dated Nov. 9, 2017.

*Primary Examiner* — Joseph A Bednash
(74) *Attorney, Agent, or Firm* — Foley & Lardner LLP

(57) ABSTRACT

Provided is a radio access network slice construction method and apparatus applied to a master base station. The method includes: constructing, by each of the master base station and at least one neighboring secondary base station in the RAN, a network slice end-to-end correspondence with a core network, and determining RAN slices information in the master base station and the neighboring secondary base station; collecting statistics, by the master base station, on Slice IDs or MDD information reported by all UEs served by the master base station, and obtaining quantity of slice resources needed to be allocated to construct RAN slices by the master base station; transmitting, by the master base station, reconstruction request information of a RAN slice to the neighboring secondary base station; and performing, by the master base station, multi-connection data transmission reconfiguration on the UEs served by the master base station through an RRC message.

18 Claims, 7 Drawing Sheets

(56) References Cited

U.S. PATENT DOCUMENTS

2017/0264535 A1* 9/2017 Choi .................. H04L 12/4641
2018/0013680 A1* 1/2018 Bull ..................... H04W 16/14
2019/0215803 A1* 7/2019 Van Phan ............. H04W 72/04

FOREIGN PATENT DOCUMENTS

CN    105791355 A    7/2016
CN    105898894 A    8/2016

* cited by examiner

RADIO ACCESS NETWORK SLICE CONSTRUCTION METHOD AND APPARATUS

CROSS-REFERENCE TO RELATED APPLICATIONS

This is a National Stage Application, filed under 35 U.S.C. 371, of International Patent Application No. PCT/CN2017/095506, filed on Aug. 1, 2017, which claims priority to Chinese Patent Application No. 201610740961.5 filed on Aug. 26, 2016, the contents of both of which are incorporated herein by reference in their entireties.

TECHNICAL FIELD

The present application relates to, but is not limited to, the technical field of communications and, in particular, to a radio access network slice construction method and apparatus.

BACKGROUND

In an era of nowadays comprehensive informatization, the application demand for traffic data transmission in various industries is explosively growing. Compared with the traditional 3rd generation (3G) and 4th generation (4G) mobile communication systems, the application scenarios the 5th generation (5G) mobile communication system facing are very different. In the future 5G mobile network, not only communications among people need to be provided, but also various services need to be provided for various and massive devices of Internet of Things. In the 5G mobile network, traffic requiring for an ultra-high data transmission rate such as virtual reality, high-definition video, traffic requiring for low latency ultra-reliable transmission service such as unmanned driving in Internet of Vehicles and telemedicine, and the density of small UEs of Internet of Things will be promoted greatly in terms of a transmission rate, a single user uplink and downlink rate, an end-to-end latency and the number of UEs capable of being access to per square meter compared with the mobile network.

The traditional communication network facing limited application scenarios adopts simple architecture curing configured by single radio access network and core network functions. This architecture cannot meet application and performance requirements of all scenarios.

And, if a dedicated network is constructed for each scenario to meet the customized application and performance requirements, waste of plenty of infrastructure or spectrum resources will be caused.

The development of network function virtualization (NFV) technology makes it possible for operators to build different virtual networks for different traffic requirements. The network slice technology of the core network and the radio access network is based on a general physical infrastructure (including compute resources, storage resources, transmission resources, etc.), and performs function definition and division logically on the network, forming an end-to-end virtual network slice. Each virtual network slice possesses different function and performance characteristics to dynamically meet various traffic requirements and business models. The NFV can implement the decoupling of software and hardware. The providers of network infrastructure and equipment no longer need to provide dedicated and application-limited hardware resources for different customers, and can introduce the concept of tenants with the help of NFV and software defined network (SDN) technologies for resource division for different tenants on the same infrastructure, implementing resource and usage isolation among tenants.

The network slice divides one physical network into multiple virtual logical networks, and each virtual network corresponds to different application scenarios. That is, one physical network is divided into multiple virtual end-to-end networks. Network devices, access, transmission, and core networks are included among each virtual network. These parts are logically independent, and failure of any one of virtual network will not affect other virtual networks. Each virtual network possesses different function characteristics, and faces different requirements and services.

SUMMARY

The following is a summary of the subject matter described herein in detail. This summary is not intended to limit the scope of the claims.

The present disclosure aims to provide a radio access network slice construction method and apparatus in which a master base station transmits network slice reconstruction configuration information to a neighboring secondary base station to enable user equipment (UE) to perform an operation of a multi-connection data transmission, obtaining a better system data transmission effect.

In a first aspect, embodiments of the present disclosure provide a radio access network slice construction method, applied to a master base station in a radio access network (RAN). The method includes:

constructing, by the master base station independent from at least one neighboring secondary base station in the RAN, a network slice end-to-end correspondence with a core network, and determining, according to the network slice end-to-end correspondence, RAN slices information in the master base station and the neighboring secondary base station;

collecting statistics, by the master base station, on slice identifiers (Slice IDs) or multiple dimension descriptor (MDD) information reported by all user equipments (UEs) served by the master base station, and obtaining quantity of slice resources needed to be allocated to construct RAN slices by the master base station; where the quantity of slice resources includes a radio physical resource, a baseband processing resource and a network transmission resource;

transmitting, by the master base station, according to the quantity of slice resources needed to be allocated to construct the RAN slices by the master base station, reconstruction request information of a RAN slice to the neighboring secondary base station; and performing, by the master base station, according to reconstruction response information of the RAN slice received from the neighboring secondary base station, multi-connection data transmission reconfiguration on the UEs served by the master base station through a radio resource control (RRC) message; where the reconstruction response information includes information about reconfiguration by the neighboring secondary base station of the RAN slices within the neighboring secondary base station according to the reconstruction request information of the RAN slice.

In one implementation mode, transmitting, by the master base station, according to the quantity of slice resources needed to be allocated to construct the RAN slices by the master base station, the reconstruction request information of the RAN slice to the neighboring secondary base station includes:

performing, by the master base station, information cooperation between an RAN slice providing a master service in the master base station and an RAN slice providing a secondary service in the neighboring secondary base station through a common initial default process of an interface between base station nodes to exchange slice state information of the RAN slices; where the slice state information includes a working state, a resource duty ratio and a congestion situation of each RAN slice; and transmitting, by the master base station, according to the slice state information of the RAN slices of the master base station, the reconstruction request information of the RAN slice to the neighboring secondary base station.

In a second aspect, embodiments of the present disclosure further provide a multi-radio access network slice construction method, applied to a neighboring secondary base station of a master base station in a radio access network. The method includes:

constructing, by the neighboring secondary base station of the master base station independent from the master base station in a radio access network, a network slice end-to-end correspondence with a core network, and determining, according to the network slice end-to-end correspondence, radio access network (RAN) slices information in the master base station and the neighboring secondary base station;

collecting statistics, by the neighboring secondary base station, on slice identifiers (Slice IDs) or multiple dimension descriptor (MDD) information reported by all user equipments (UEs) served by the neighboring secondary base station, and receiving reconstruction request information of a RAN slice transmitted by the master base station;

performing, by the neighboring secondary base station, determination of RAN slice reconstruction according to the reconstruction request information of the RAN slice transmitted by the master base station, a local condition of the neighboring secondary base station, and quantity of slice resources needed to be allocated to construct the RAN slices by the neighboring secondary base station; where the quantity of slice resources includes a radio physical resource, a baseband processing resource and a network transmission resource; and transmitting, by the neighboring secondary base station, a reconstruction response message of the RAN slice to the master base station.

In one implementation mode, collecting statistics, by the neighboring secondary base station, on Slice IDs or MDD information reported by all UEs served by the neighboring secondary base station, and receiving reconstruction request information of the RAN slice transmitted by the master base station includes:

collecting statistics, by the neighboring secondary base station, on the Slice IDs or the MDD information reported by all UEs served by the neighboring secondary base station, and obtaining the quantity of slice resources needed to be allocated to construct the RAN slices by the neighboring secondary base station; and performing, by the neighboring secondary base station, information cooperation between the RAN slices in the master base station and the neighboring secondary base station through a common initial default process of an interface between base station nodes, and receiving the reconstruction request information of the RAN slice transmitted by the master base station.

In one implementation mode, performing, by the neighboring secondary base station, the information cooperation between the RAN slices in the master base station and the neighboring secondary base station through the common initial default process of the interface between base station nodes, and receiving the reconstruction request information of the RAN slice transmitted by the master base station includes:

performing, by the neighboring secondary base station, the information cooperation between an RAN slice providing a secondary service in the neighboring secondary base station and an RAN slice providing a master service in the master base station through the common initial default process of the interface between base station nodes to exchange slice state information of the RAN slices; and obtaining, by the neighboring secondary base station, the slice state information of the RAN slices of the master base station and receiving the reconstruction request information of the RAN slice transmitted by the master base station.

In one implementation mode, performing, by the neighboring secondary base station, the determination of RAN slice reconstruction according to the reconstruction request information of the RAN slice transmitted by the master base station, the local condition of the neighboring secondary base station, and the quantity of slice resources needed to be allocated to construct the RAN slices by the neighboring secondary base station includes:

in response to determining that the local condition of the neighboring secondary base station and the quantity of slice resources needed to be allocated to construct the RAN slices by the neighboring secondary base station satisfy a reconstruction request of the RAN slice transmitted by the master base station, accepting, by the neighboring secondary base station, the reconstruction request of the RAN slice, and adjusting quantity of slice resources among slices within the neighboring secondary base station; and in response to determining that at least one of the local condition of the neighboring secondary base station and the quantity of slice resources needed to be allocated to construct the RAN slices by the neighboring secondary base station do not satisfy the reconstruction request of the RAN slice transmitted by the primary base station, refusing, by the neighboring secondary base station, the reconstruction request of the RAN slice, and keeping an allocation state of the slice resources unchanged.

In a third aspect, embodiments of the present disclosure further provide a radio access network slice construction apparatus, applied to a master base station in a radio access network (RAN). The apparatus includes: a first determination module, a first acquisition module, a first transmission module and a configuration module.

The first determination module is configured to construct, independently from at least one neighboring secondary base station, a network slice end-to-end correspondence with a core network, and determine, according to the network slice end-to-end correspondence, RAN slices information in the master base station and the neighboring secondary base station.

The first acquisition module is configured to collect statistics on Slice IDs or MDD information reported by all UEs served by the master base station, and obtain, quantity of slice resources needed to be allocated to construct RAN slices by the master base station. The quantity of slice resources comprises a radio physical resource, a baseband processing resource and a network transmission resource.

The first transmission module is configured to transmit, according to the quantity of slice resources needed to be allocated to construct the RAN slices by the master base station, reconstruction request information of a RAN slice to the neighboring secondary base station.

The configuration module is configured to perform, according to reconstruction response information of the RAN slice received from the neighboring secondary base station, multi-connection data transmission reconfiguration on the UEs served by the master base station through a radio resource control (RRC) message. The reconstruction response information includes information about reconfiguration, by the neighboring secondary base station of the RAN slices within the neighboring secondary base station, according to the reconstruction request information of the RAN slice.

In one implementation mode, the apparatus further includes a first cooperation module.

The first cooperation module is configured to perform information cooperation between an RAN slice providing a master service in the master base station and an RAN slice providing a secondary service in the neighboring secondary base station through a common initial default process of an interface between base station nodes to exchange slice state information of the RAN slices. The slice state information comprises a working state a resource duty ratio and a congestion situation of each RAN slice.

The first transmission module is configured to transmit, according to the slice state information of the RAN slices of the master base station, the reconstruction request information of the RAN slice to the neighboring secondary base station.

In a fourth aspect, embodiments of the present disclosure provide a radio access network slice construction apparatus, applied to a neighboring secondary base station of a master base station in a radio access network. The apparatus includes: a second determination module, a reception module, a determining module and a second transmission module.

The second determination module is configured to construct, independently from the master base station, a network slice end-to-end correspondence, and determine, according to the network slice end-to-end correspondence, radio access network (RAN) slices information in the master base station and the neighboring secondary base station.

The reception module is configured to collect statistics on slice IDs or MDD information reported by all UEs served by the neighboring secondary base station, and receive reconstruction request information of a RAN slice transmitted by the master base station.

The determining module is configured to perform determination of RAN slice reconstruction according to the reconstruction request information of the RAN slice transmitted by the master base station, a local condition of the neighboring secondary base station, and quantity of slice resources needed to be allocated to construct the RAN slices by the neighboring secondary base station. The quantity of slice resources includes a radio physical resource, a baseband processing resource and a network transmission resource.

The second transmission module is configured to transmit a reconstruction response message of the RAN slice to the master base station.

In one implementation mode, the apparatus further includes a second acquisition module and a second cooperation module.

The second acquisition module is configured to collect statistics on Slice IDs or MDD information reported by all UEs served by the neighboring secondary base station, and obtain the quantity of slice resources needed to be allocated to construct the RAN slices by the neighboring secondary base station.

The second cooperation module is configured to perform information cooperation with the RAN slices in the master base station through a common initial default process of an interface between base station nodes.

The reception module is configured to receive the reconstruction request information of the RAN slice transmitted by the master base station.

In one implementation mode, the second cooperation module is configured to perform information cooperation between an RAN slice providing a secondary service in the neighboring secondary base station and an RAN slice providing a master service in the master base station through the common initial default process of the interface between the base station nodes to exchange slice state information of the RAN slices.

The reception module is configured to obtain the slice state information of the RAN slices of the neighboring secondary base station and receive the reconstruction request information of the RAN slice transmitted by the master base station.

In one implementation mode, the determining module is configured to accept, a reconstruction request of the RAN slice in response to determining that the local condition of the neighboring secondary base station and the quantity of slice resources needed to be allocated to construct the RAN slices by the neighboring secondary base station satisfy the reconstruction request of the RAN slice transmitted by the master base station; and the determining module is configured to refuse the reconstruction request of the RAN slice and keep an allocation state of the slice resources unchanged in response to determining that at least one of local condition of the neighboring secondary base station and the quantity of slice resources needed to be allocated to construct the RAN slices by the neighboring secondary base station do not satisfy the reconstruction request of the RAN slice transmitted by the master base station.

In a fifth aspect, embodiments of the present disclosure further provide a computer-readable storage medium configured to store computer-executable instructions for executing a radio access network slice construction method in the first aspect when executed by a processor.

In a sixth aspect, embodiments of the present disclosure further provide a computer-readable storage medium configured to store computer-executable instructions for executing a radio access network slice construction method in the second aspect when executed by a processor.

The embodiments of the present disclosure provide a radio access network slice construction method and apparatus for a multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

Other aspects can be understood after the drawings and detailed description are read and understood.

DETAILED DESCRIPTION

Embodiments of the present disclosure will be described clearly and completely in conjunction with drawings in the embodiments of the present disclosure.

Figure 1:
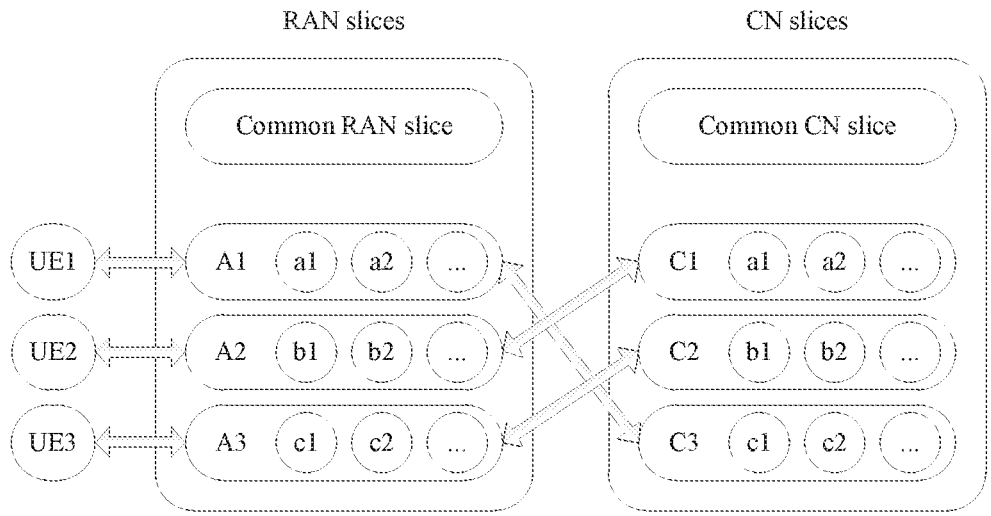
FIG. 1 is a schematic diagram of a matching relationship between a UE and a RAN/CN slice in a mode of a single connection data transmission.

FIG. 1 is a schematic diagram of architecture for a mobile network slice. Each of a Common/Default CN Slice and three Dedicated CN Slice (C1,C2,C3) in a CN corresponds to different operator. Each of a Common/Default RAN Slice and three Dedicated RAN Slice (A1,A2,A3) in a RAN corresponds to different data traffic type. For example, type A1 is ultra-high speed data traffic, video traffic and virtual reality; type A2 is data traffic of a small burst packet, such as QQ and Wechat; and type A3 is low latency ultra-reliable data traffic, such as unmanned driving in Internet of Vehicles and telemedicine. Each UE, through reporting its own MDD type attribute, enables the RAN to be capable of selecting the most matched and suitable RAN Slice (RAN Part of NW Slice). In addition, according to subscription information and type of the UE user, each UE user enables the CN to be capable of selecting the most matched and suitable CN Slice (CN Part of NW Slice). In response to determining that there is no dedicated CN/RAN Slice can match, the network is operative to refuse accessing and using of the UE, or match the CN/RAN to the Common/Default CN/RAN Slice for a uniform uncustomized common processing. In this common mode, the data transmission service obtained by the UE usually is not better than the customized service provided by a dedicated slice, therefore, the data transmission function and performance of the data transmission service is weaker.

A matching relationship between the UE and the RAN/CN slice in the mode of a single connection data transmission (i.e., establishing and maintaining a radio link (RL) with a single communication base station) has been described. With the development of multi-connection data transmission technologies in the 5G system, the UE is operative to establish and maintain multiple radio links at the same time with multiple communication base stations while performing an uplink and downlink transmission and relevant control feedback of control plane/user plane data. In the mode of the multi-connection data transmission, usually only one master anchor base station (master base station) and multiple secondary offloading base stations (secondary base station). The master base station is mainly responsible for control plane functions such as establishing, maintaining and releasing of the entire multi-connection operation, and the secondary base station is mainly responsible for functions such as offloading and forwarding of the relevant user plane data, so that a data stream which can only be transmitted between the master base station and the UE can be offloaded and transmitted in the multiple RLs, in such way, radio resources, spatial domain, time domain, frequency domain of an air interface can be more fully and efficiently used. For example, a Long Term Evolution (LTE) or Long Term Evolution Advanced (LTE-A) system under 3rd Generation Partnership Project (3GPP) standards introduces a Dual Connectivity (DC) function in a Rel-12 version. The DC function enables the single UE to be capable of performing the RL between a Master Evolved Node B (MeNB) and a Secondary Evolved Node B (SeNB) and a transceiving transmission of uplink and downlink user traffic data. The LTE/LTE-A system under the 3GPP standards further introduces a LTE WLAN Aggregation (LWA) function in a Rel-13 version, the radio resources are aggregated and used in a radio access layer between the LTE system and WLAN system. The LWA function enables the single UE to be operative to perform the RL between a MeNB and WLAN secondary base station (WT) and the transceiving transmission of the uplink and downlink user traffic data at the same time. In response to determining that the typical "dual connectivity operation" described above further performs dimension extension and mashup combination, the mode of the multi-connection data transmission including more RLs is operative to be generated, i.e., the UE is communicated with more than two serving base station modes.

Figure 2:
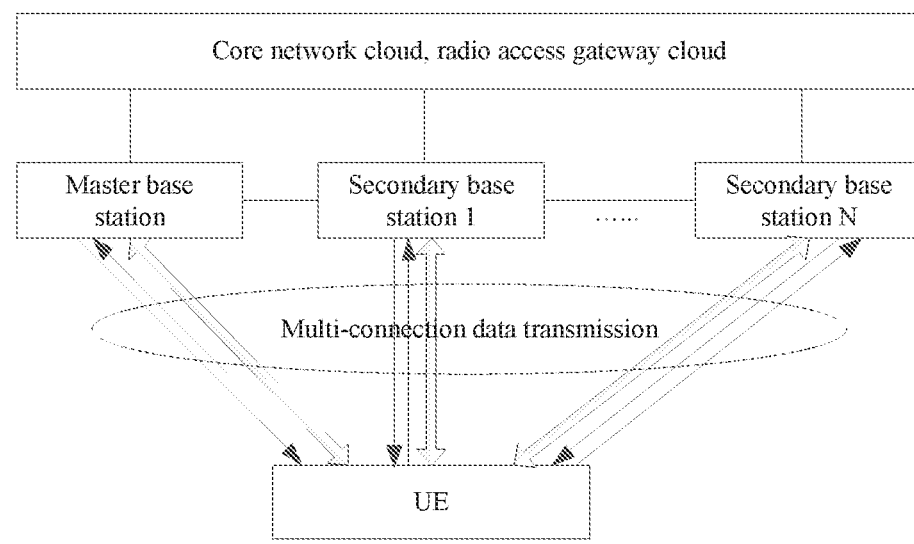
FIG. 2 is a schematic diagram of a working mode of a multi-connection data transmission according to an embodiment of the present disclosure.

Referring to FIG. 2, a working mode of the multi-connection data transmission in the mobile communication system is shown. Unidirectional thin arrows represent transmission of control signaling, and bidirectional thick arrows represent transmission of user traffic data. In the working mode of the multi-connection data transmission, the UE needs to perform a reasonable RAN Slice selection with each base station mode participating in the cooperation offloading, so that, the UE can enjoy a better slice service not only in the working mode of the single connection data transmission but also in the working mode of the multi-connection data transmission.

Embodiment One

Figure 3:
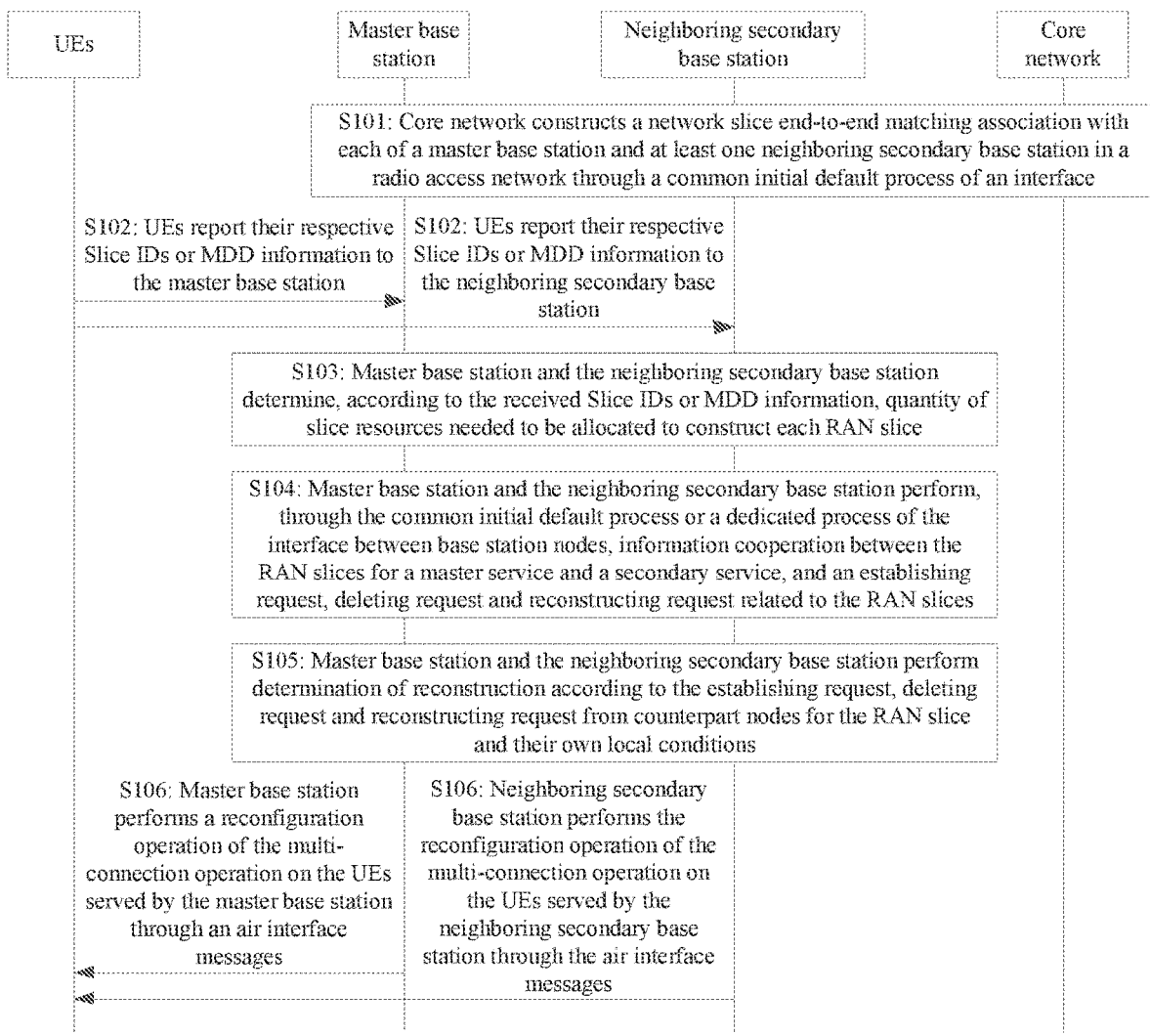
FIG. 3 is a flowchart of a radio access network slice construction method of a multi-connection data transmission according to embodiment one of the present disclosure.

Referring to FIG. 3, embodiments of the present disclosure provide a radio access network slice construction method. The method includes steps described below.

In step S101, a core network constructs a network slice end-to-end matching association with each of a master base station and at least one neighboring secondary base station in a radio access network through a common initial default process of an interface.

Based on the common initial default process of the interface between the CN and the RAN, the CN and all base stations governed by the CN perform the network slice end-to-end initial construction and matching association to form their respective division of common initial default or dedicated multiple dedicated CN slices and RAN slices. Therefore, network functions and network resource configuration corresponding to each of the CN and all base stations governed by the CN are also determined.

In step S102, UEs report their respective Slice IDs or MDD information to the master base station and the neighboring secondary base station.

Types of traffic UEs may be described by MDD attributes and include: tenant user information, slice information (a slice type and/or a slice identifier), traffic information (a traffic type and/or quality of experience (QoE) and/or quality of service (QoS), an application ID) or ID information used and customized by the operator. A network is operative to configure, according to a MDD value, different processing strategy and parameter set. Slice ID information also reflects the slice information in the master base station and the neighboring secondary base station.

In step S103, the master base station and the neighboring secondary base station determine, according to the received Slice IDs or MDD information, quantity of slice resources needed to be allocated to construct each RAN slice.

Exemplarily, in response to determining that many traffic UEs of enhanced mobile broadband (eMBB) type are provided in the master base station, the master base station will construct RAN slices of eMBB type with larger quantity of slice resources, and many traffic UEs of ultra-reliable low latency communication (URLLC) type are provided in the neighboring secondary base station, the neighboring secondary base station will construct the RAN slices of eMBB type with larger quantity of slice resources.

In step S104, the master base station and the neighboring secondary base station perform, through the common initial default process or a dedicated process of the interface between base station nodes, information cooperation between the RAN slices for a master service and a secondary service, and an establishing request, deleting request and reconstructing request related to the RAN slices.

The RAN base station nodes need to be notified each other and cooperate their respective real-time RAN slice split and working states through a common initial default signaling process, including: RAN slice information currently configured in a certain base station node, whether the working state of each RAN slice is normal, a slice load state, a resource usage rate, and whether is operative to be the RAN slice providing the secondary service for a neighboring master base station.

In the process of establishing and maintaining the multi-connection data transmission for the UEs by the master base station, in response to determining that the master base station needs to start to offload, or offload more data of specific UEs traffic type into the RAN slices corresponding to the secondary base station, the master base station is operative to transmit, through the common initial default signaling process between the base station nodes, a request for starting to construct or reconstructing relevant RAN slices for the secondary service to the secondary base station in order to increase quantity of RAN slice resources corresponding to the secondary base station. Similarly, in response to determining that the master base station needs to cease to offload, or offload less data of specific UEs traffic type into the RAN slices corresponding to the secondary base station, the master base station is operative to transmit, through the common initial default signaling process between the base station nodes, a request for deleting or reconstructing relevant RAN slices for the secondary service to the secondary base station in order to decrease the quantity of RAN slice resources corresponding to the secondary base station.

Since a specific Slice ID or the MDD is capable of reflecting current traffic characteristics of a specific UE, the master base station is also operative to transmit the Slice IDs or MDD statistics summary information of all UEs currently serving (for example, how many user UEs are provided under each Slice ID or MDD) through the common initial default signaling process to the secondary base station for a construction reference of the RAN slices for the secondary service.

In the process of establishing and modifying a multi-connection operation for the specific UE, the master base station is also operative to transmit, through a dedicated signaling process between base stations, the Slice ID or MDD information related to the specific UE, to the secondary base station together with requests for starting to construct, delete or reconstruct relevant RAN slices for the secondary service. In this way, the secondary base station is also operative to perform, based on the Slice ID or the MDD information and a slice reconstruction request transmitted from each UE performing the multi-connection operation, a local statistics summary of the secondary base station, thereby further performing the construction reference of the RAN slices for the secondary service.

In step S105, the master base station and the neighboring secondary base station perform determination of reconstruction according to the establishing request, deleting request and reconstructing request from counterpart nodes for the RAN slice and their own local conditions.

The secondary base station reconstructs the RAN slices for the secondary service and reallocates network resources to each RAN slice of the secondary base station based on the requests for starting to construct, delete or reconstruct relevant RAN slices for the secondary service from the master base station, the Slice IDs or MDD statistics summary information of all UEs and other local situations of the secondary base station. The secondary base station is also operative to refuse requests from the master base station and notify itself of the current division, whether the working state is normal, the load state and the resource usage rate of each RAN slice.

In the process of establishing and maintaining the multi-connection data transmission by the secondary base station for the UEs, in response to determining that the secondary base station needs to start to offload, or offload more data of specific UEs traffic type into the RAN slices corresponding to the master base station, the secondary base station is operative to transmit, through the common initial default signaling process between the base station nodes, the request for starting to construct or reconstructing the relevant RAN slices for the secondary service to the master base station in order to increase quantity of RAN slice resources corresponding to the master base station. Similarly, in response to determining that the secondary base station needs to cease to offload, or offload less data of specific UEs traffic type into the RAN slices corresponding to the master base station, the secondary base station is operative to transmit, through the common initial default signaling process between the base station nodes, the request for deleting or reconstructing relevant RAN slices for the secondary service to the master base station in order to decrease the quantity of RAN slice resources corresponding to the master base station.

Since the specific Slice ID or the MDD is capable of reflecting the current traffic characteristics of the specific UE, the secondary base station is also operative to transmit the Slice IDs or the MDD statistics summary information of all UEs currently serving (for example, how many user UEs are provided under each Slice ID or MDD) through the above common initial default signaling process to the master base station for a construction reference of the RAN slices for the master service.

In the process of establishing and modifying the multi-connection operation for the specific UE, the secondary base station is also operative to transmit, through the dedicated signaling process between the base stations, the Slice ID or MDD information related to the specific UE, to the master base station together with the request for starting to construct, delete or reconstruct the relevant RAN slices for the secondary service. In this way, the master base station is also operative to perform, based on the Slice ID or the MDD information and the slice reconstruction request transmitted from each UE performing the multi-connection operation, a local statistics summary of the master base station, thereby further performing the construction reference of the RAN slices for the master service.

The master base station reconstructs the RAN slices for the master service and reallocates the network resources to each RAN slice of the master base station based on the requests for starting to construct, delete or reconstruct relevant RAN slices for the secondary service from the secondary base station, the Slice IDs or MDD statistics summary information of all UEs and other local situations of the master base station. The master base station is also operative to refuse requests from the secondary base station and notify itself of the current division, whether the working state is normal, the load state and the resource usage rate of each RAN slice.

In step S106, the master base station and the neighboring secondary base station perform a reconfiguration operation of the multi-connection operation on the UEs served by the master base station and the neighboring secondary base station through their respective air interface messages.

It is to be understood that after completing the network slice reconfiguration, the master base station and the neighboring secondary base station are operative to perform the reconfiguration operation of the multi-connection operation on the UEs served by the master base station and the neighboring secondary base station to enable the UEs in a better state of multi-connection data transmission.

Embodiment Two

The above embodiment is described in detail by this embodiment through a process of constructing a network slice in a base station in a radio access network. Three processes for performing a multi-connection data transmission operation by four base stations: a next generation core (NG-Core), an eLTE eNB, a NR gNB1 and a NR gNB2 are illustrated below.

First Embodiment

Figure 4:
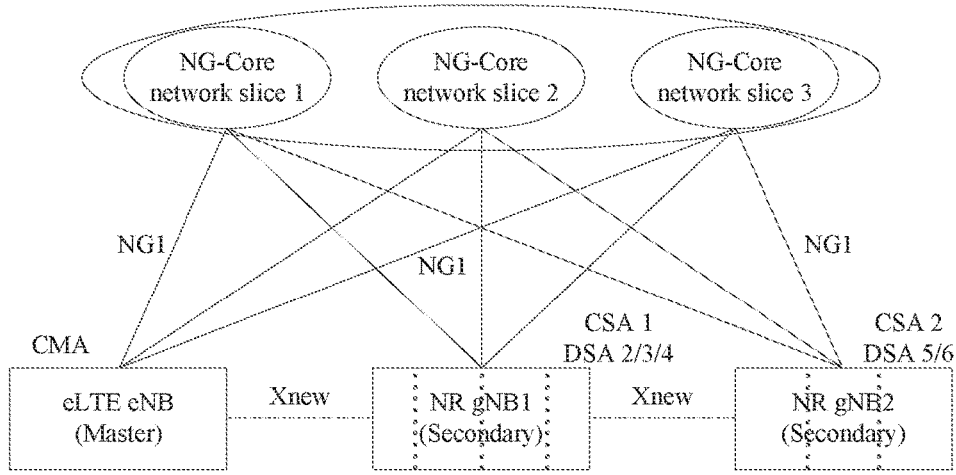
FIG. 4 is a schematic diagram one illustrating connection between a core network and various base stations in a radio access network according to embodiment two of the present disclosure.

Referring to FIG. 4, according to traffic types, the NG-Core is divided into three CN slices: enhanced mobile broadband (eMBB), ultra reliable low latency communication (URLLC) and massive machine type communication (mMTC), which are respectively represented by NG-Core Slice1, NG-Core Slice2 and NG-Core Slice3. An eLTE eNB with the largest radio signal coverage area serves as a master base station. Inside the eLTE eNB, no division for reconfiguration of any dedicated radio access network slice (dedicated RAN slice) is performed, i.e., only one common radio access network slice (common/default RAN slice) is provided. A NR gNB1 with a smaller radio signal coverage area is operative to serve as a secondary base station to perform data offloading. Inside the NR gNB1 one common/default RAN slice and three dedicated RAN slices are configured and divided, respectively corresponding to eMBB-type traffic, URLLC-type traffic and mMTC-type traffic. A NR gNB2 with a smaller radio signal coverage area is operative to serve as another secondary base station to perform the data offloading. Inside the NR gNB2, one common/default RAN slice and two dedicated RAN slices are configured and divided, respectively corresponding to the eMBB-type traffic and the mMTC-type traffic (therefore, the NR gNB2 cannot effectively support the URLLC-type traffic). At a certain point, a UE1 enters a common coverage area of service signals of the eLTE eNB, the NR gNB1 and the NR gNB2, thereby possessing a radio condition for performing a multi-connection data transmission. The eLTE eNB, the NR gNB1 and the NR gNB2 are base stations in a NG-RAN, and an interface between the NG-Core and the NG-RAN is NG1. It can be seen from FIG. 4 that the three CN slices in the NG-Core are coupled to a respective one of the three base stations: the eLTE eNB, the NR gNB1 and the NR gNB2 in the NG-RAN through NG1. The CMA in FIG. 4 is a common/default master RAN slice, i.e., a common network slice inside the master base station, supporting all legitimate-type traffic and UEs. The CSA is a common/default secondary RAN slice, i.e., a common network slice inside the secondary base station, supporting all legitimate-type traffic and UEs. The DSA is a dedicated secondary RAN slice, i.e., a dedicated network slice inside the secondary base station, and supports a specific-type traffic and UEs. The purpose of the DSA is providing a customized optimal data transmission service. The DSA2/3/4 respectively corresponds to the eMBB, the URLLC, and the mMTC, and the DSA5/6 respectively corresponds to the eMBB and the mMTC.

In the above scenario, steps of radio access network slice construction in the mode of the multi-connection data transmission are described below.

In step 1, based on a common initial default process of the interface NG1 between the NG-Core and the NG-RAN, a CN and all base stations governed by the CN firstly perform a network slice end-to-end construction and matching association, and configure to form their respective initial resource division of multiple common or dedicated CN slices and RAN slices.

In step 2, UEs, which are in and not yet in the multi-connection data transmission operation in an eLTE eNB serving cell, report their respective Slice IDs or MDD information to the master base station eNB through a radio resource control (RRC) air interface message slice.

Info report or RRC connection setup complete, so that, the eNB is capable of roughly understanding different types, users, and traffic distribution characteristics of the UEs the eNB currently serves.

In step 3, the master base station eNB and the candidate secondary base station gNB1/gNB2 are both capable of statistically summarizing the relevant Slice IDs or MDD information of all UEs served by the master base station eNB and the candidate secondary base station gNB1/gNB2, and ideal quantity of slice resources needed to be allocated to ideally construct each RAN slice is operative to be speculated. In a certain period, the master base station eNB finds that there are many eMBB-type traffic UEs it serves, and resources of the eNB are under great pressure. However, the secondary base station gNB1 finds that there are few URLLC-type traffic UEs it serves, i.e., most resources of the DSA3 slice are in an idle state; and the secondary base station gNB2 finds that there are few mMTC-type traffic UEs it serves, i.e., most resources of the DSA6 slice are in the idle state.

In step 4, an information and state cooperation of the RAN slices for the master and secondary service configuration is performed between the master base station eNB and the secondary base station gNB1/gNB2 through the common initial default process of the interface Xnew between the base station nodes, thereby understanding a counterpart slice state, so that, the eNB puts forward a reconstruction request of the RAN slice to the gNB1/gNB2, and transmits the relevant Slice IDs or MDD information of all UEs and having statistically summarized by the eNB itself to the gNB1/gNB2 as reference through a common initial default process message.

In step 5, according to the reconstruction request of the RAN slice transmitted from the master base station eNB and other local conditions, the secondary base station gNB1 performs determination and operation of reducing the DSA3 slice and enlarging the DSA2 slice (in this way, the gNB1 has more network resources to serve the eMBB-type traffic and enables the master base station eNB to offload more eMBB-type traffic data originally carried by the master base station eNB to the gNB1 for transmission). Similarly, the gNB2 performs determination and operation of reducing the DSA6 slice and enlarging the DSA5 slice (in this way, the gNB2 has more network resources to serve the eMBB-type traffic and enables the master base station eNB to offload more eMBB-type traffic data originally carried by the master base station eNB to the gNB2.

In step 6, after the secondary base station gNB1/gNB2 has performed the slice reconstruction, the master base station eNB performs, based on common initial default process feedback of the secondary base station gNB1/gNB2, a multi-connection construction operation on the UEs that are not yet in the multi-connection data transmission operation through air interface message RRC connection reconfiguration, so that more UEs that are already in a better multi-connection data transmission state. At the same time, the more eMBB-type traffic data of the UEs in the multi-connection data transmission operation is offloaded to the gNB1/gNB2.

Second Embodiment

Figure 5:
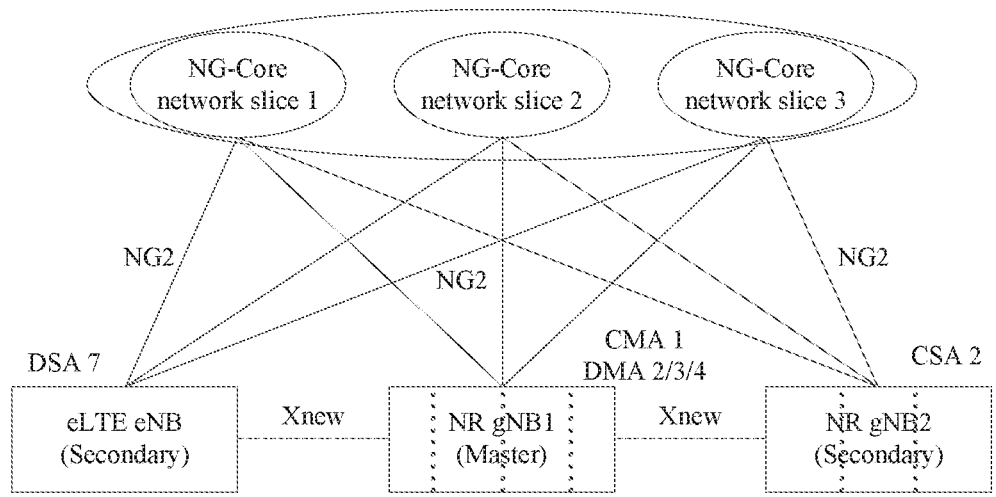
FIG. 5 is a schematic diagram two illustrating connection between a core network and various base stations in a radio access network according to embodiment two of the present disclosure.

Referring to FIG. 5, the NG-Core is divided into three CN slices: eMBB, URLLC and mMTC according to traffic types. A NR gNB1 with the largest radio signal coverage area serves as a master base station. Inside the NR gNB1, one common/default RAN slice and three dedicated RAN slices are configured and divided, respectively corresponding to three types of traffic: the eMBB, the URLLC and the mMTC. An eLTE eNB with a smaller radio signal coverage area is operative to serve as a secondary base station to perform data offloading. Inside the eLTE eNB, one common/default RAN slice and one dedicated RAN slice are configured and divided, corresponding to URLLC-type traffic. A NR gNB2 with a smaller radio signal coverage area is operative to serve as another secondary base station to perform the data offloading. Inside the NR gNB2, one common/default RAN slice and two dedicated RAN slices are configured and divided, respectively corresponding to the eMBB-type traffic and URLLC-type traffic. At a certain point, a UE2 enters a common coverage area of service signals of the eLTE eNB, the NR gNB1 and the NR gNB2, thereby possessing a radio condition for performing a multi-connection data transmission. In FIG. 5, the DMA is a dedicated master RAN slice, i.e., a dedicated network slice inside the secondary base station, and supports traffic and UEs of a specific type. The purpose of the DMA is providing a customized optimal data transmission service.

In the above scenario, steps of radio access network slice construction in the mode of the multi-connection data transmission are described below.

In step 1, based on a common initial default process of the interface NG2 between the NG-Core and the NG-RAN, a CN and all base stations governed by the CN firstly perform a network slice end-to-end construction and matching association, and configure to form their respective initial resource division of multiple common or dedicated CN slices/RAN slices.

In step 2, UEs, which are in and not yet in the multi-connection data transmission operation in a NR gNB1 serving cell, report their respective Slice IDs or MDD information to the master base station eNB through a RRC air interface message slice Info report or RRC connection setup complete, so that, the gNB1 is capable of roughly understanding different types, users, and traffic distribution characteristics of the UEs the gNB1 currently serves.

In step 3, the master base station gNB1 and the candidate secondary base station eNB/gNB2 are both capable of statistically summarizing the relevant Slice IDs or MDD information of all UEs served by the master base station gNB1 and the candidate secondary base station eNB/gNB2, and ideal quantity of slice resources needed to be allocated to construct each RAN slice is operative to be speculated. In a certain period, the master base station gNB1 finds that there are many URLLC-type traffic UEs it serves, and resources of the gNB1 are under great pressure. However, the secondary base station gNB2 finds that there are few eNBB-type traffic UEs it serves, i.e., most resources of the DSA5 slice are in an idle state; and the secondary base station eNB finds that there are few common/default-type traffic UEs it serves, i.e., most resources of the CSA3 slice are in the idle state. In step 4, an information and state cooperation of the RAN slices for the master and secondary service configuration is performed between the master base station gNB1 and the secondary base station gNB2/eNB through the common initial default process of the interface Xnew between the base station nodes, thereby understanding a counterpart slice state, so that, the gNB1 puts forward a reconstruction request of the RAN slice to the gNB2/eNB, and transmits the relevant Slice IDs or MDD information of all UEs and having statistically summarized by the gNB1 itself to the gNB2/eNB as reference through a common initial default process message.

In step 5, according to the reconstruction request of the RAN slice transmitted from the master base station gNB1 and other local conditions, the secondary base station gNB2/eNB performs determination and operation of reducing the DSA5 slice and enlarging the DSA6 slice (in this way, the gNB2 has more network resources to serve the URLLC-type traffic and enables the master base station gNB1 to offload more URLLC-type traffic data originally carried by the master base station eNB to the gNB1 for transmission). Similarly, the eNB performs determination and operation of reducing the CSA3 slice and enlarging the DSA7 slice (in this way, the eNB has more network resources to serve the URLLC-type traffic and enables the master base station gNB1 to offload more URLLC-type traffic data originally carried by the master base station gNB1 to the eNB.

In step 6, after the secondary base station gNB2/eNB has performed the slice reconstruction, the master base station gNB1 performs, based on common initial default process feedback of the secondary base station gNB2/eNB, a multi-connection construction operation on the UEs that are not yet in the multi-connection data transmission operation through air interface message RRC connection reconfiguration, so that more UEs that are already in a better multi-connection data transmission state. At the same time, the more URLLC-type traffic data of the UEs in the multi-connection data transmission operation is offloaded to the gNB2/eNB.

Third Embodiment

Figure 6:
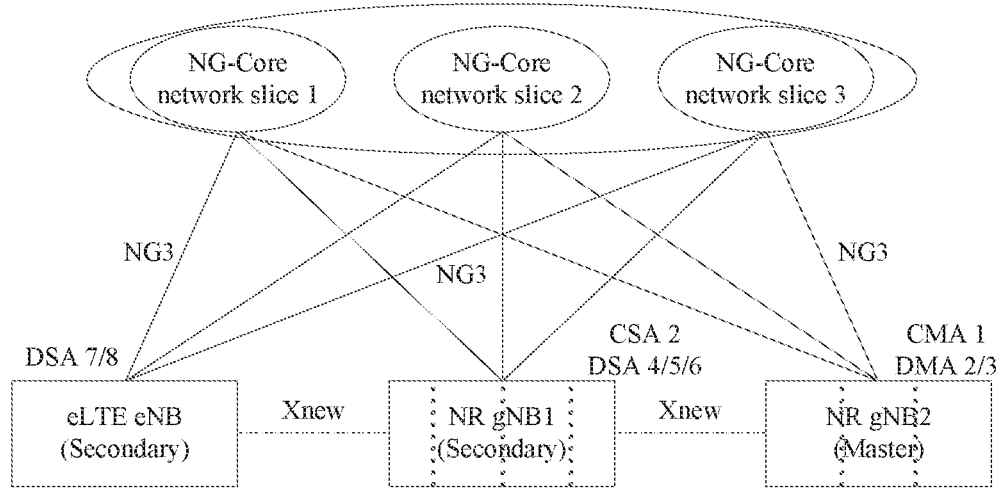
FIG. 6 is a schematic diagram three illustrating connection between a core network and various base stations in a radio access network according to embodiment two of the present disclosure.

Referring to FIG. 6, the NG-Core is divided into three CN slices: Gold, Silver and Bronze according to user types. A NR gNB2 with the largest radio signal coverage area serves as a master base station. Inside the NR gNB2, one common/default RAN slice corresponding to a Bronze user type and two dedicated RAN slices respectively corresponding to a Gold user type and a Silver user type are configured and divided. An eLTE eNB with a smaller radio signal coverage area is operative to serve as a secondary base station to perform data offloading. Inside the eLTE eNB, one common/default RAN slice and two dedicated RAN slice are configured and divided, the corresponding rule of the eLTE eNB is consistent with the NR gNB2. A NR gNB1 with a smaller radio signal coverage area is operative to serve as another secondary base station to perform the data offloading. Inside the NR gNB1, one common/default RAN slice and three dedicated RAN slices are configured and divided, respectively corresponding to the Bronze user type, the Gold user type and the Silver user type. At a certain point, a UE3 enters a common coverage area of service signals of the eLTE eNB, the NR gNB1 and the NR gNB2, thereby possessing a radio condition for performing a multi-connection data transmission.

In the above scenario, steps of radio access network slice construction in the mode of the multi-connection data transmission are described below.

In step 1, based on a common initial default process of the interface NG between the NG-Core and the NG-RAN, a CN and all base stations governed by the CN firstly perform a network slice end-to-end construction and matching association, and configure to form their respective initial resource division of multiple common or dedicated CN slices/RAN slices.

In step 2, UEs, which are in and not yet in the multi-connection data transmission operation in a NR gNB2 serving cell, report their respective Slice IDs or MDD information to the master base station gNB2 through a RRC air interface message connection reconfiguration complete or RRC connection setup complete, so that, the gNB2 is capable of roughly understanding different types, users, and traffic distribution characteristics of the UEs the gNB2 currently serves.

In step 3, the master base station gNB2 and the candidate secondary base station eNB/gNB1 are both capable of statistically summarizing the relevant Slice IDs or MDD information of all UEs served by the master base station gNB2 and the candidate secondary base station eNB/gNB1, and ideal quantity of slice resources needed to be allocated to construct each RAN slice is operative to be speculated. In a certain period, the master base station gNB2 finds that there are many Gold-type traffic UEs it serves, and resources of the gNB2 are under great pressure. However, the secondary base station gNB1 finds that there are few Silver-type traffic UEs it serves, i.e., most resources of the DSA5 slice are in an idle state; and the secondary base station eNB finds that there are few common/default-type and Silver-type traffic UEs it serves, i.e., most resources of the CSA3 slice and the DSA8 slice are in the idle state.

In step 4, an information and state cooperation of the RAN slices for the master and secondary service configuration is performed between the master base station gNB2 and the secondary base station gNB1/eNB through a dedicated process of the interface Xnew between the base station nodes (pointing for the granularity of a single UE) and a dedicated process of a multi-connection construction operation for a UE3, thereby understanding a counterpart slice state, so that, the gNB2 puts forward a reconstruction request of the RAN slice to the gNB1/eNB, and transmits the relevant Slice IDs or MDD information of all UEs and having statistically summarized by the gNB2 itself to the gNB1/eNB as reference through a dedicated process message for the UE3.

In step 5, according to the reconstruction request of the RAN slice transmitted from the master base station gNB2 and other local conditions, the secondary base station gNB1/eNB performs determination and operation of reducing the DSA5 slice and enlarging the DSA4 slice (in this way, the gNB1 has more network resources to serve the Gold user type and enables the master base station gNB2 to offload more traffic data of the Gold user type originally carried by the master base station gNB2 to the gNB1 for transmission). Similarly, the eNB performs determination and operation of reducing the CSA3 slice and the DSA8 slice and enlarging the DSA7 slice (in this way, the eNB has more network resources to serve the Gold user type and enables the master base station gNB2 to offload more traffic data of the Gold user type originally carried by the master base station gNB2 to the eNB.

In step 6, after the secondary base station gNB1/eNB has performed the slice reconstruction, the master base station gNB2 performs, based on dedicated process feedback of the secondary base station gNB1/eNB, a multi-connection construction operation on the UEs that are not yet in the multi-connection data transmission operation, including the UE3 through air interface message RRC connection reconfiguration, so that more UEs that are already in a better multi-connection data transmission state. At the same time, the more traffic data of the Gold user type of the UEs in the multi-connection data transmission operation is offloaded to the gNB1/eNB.

Embodiment Three

Figure 7:
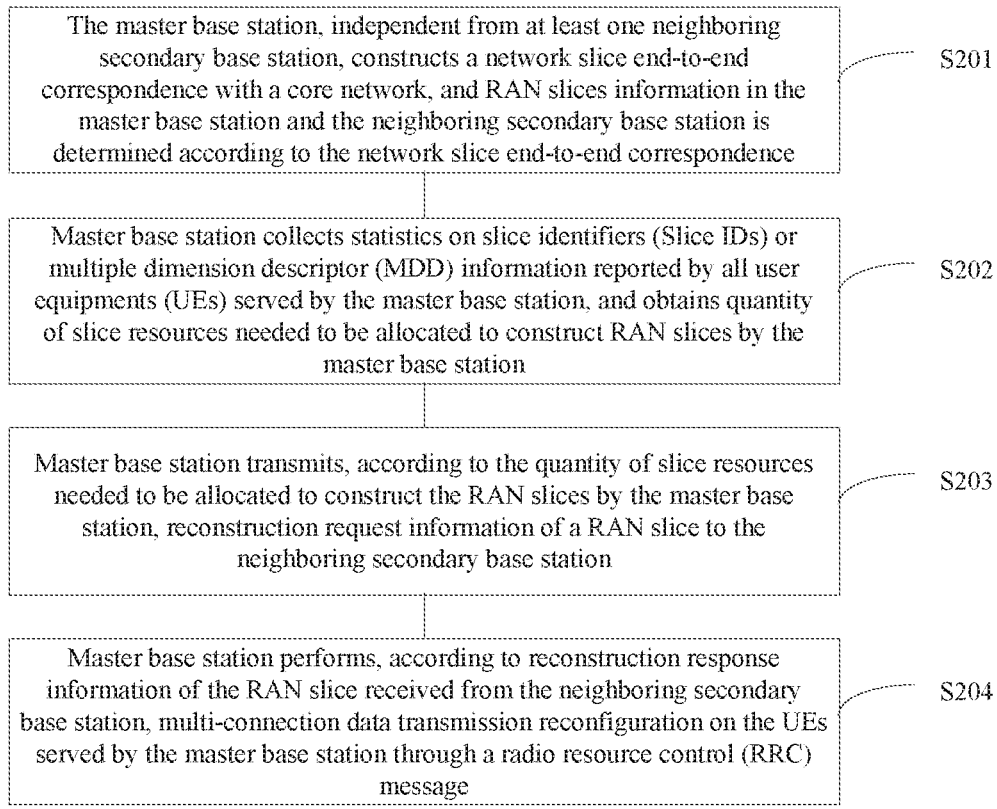
FIG. 7 is a flowchart one of a radio access network slice construction method of a multi-connection data transmission according to embodiment three of the present disclosure.

Referring to FIG. 7, embodiments of the present disclosure provide a radio access network slice construction method, applied to a master base station in a radio access network (RAN). The method includes steps described below.

In step S201, each of the master base station and at least one neighboring secondary base station construct a network slice end-to-end correspondence with a core network, and according to the network slice end-to-end correspondence, RAN slices information in the master base station and the neighboring secondary base station is determined.

It is to be understood that RAN slices are operative to be divided into common and dedicated network slices. And the RAN slices are also operative to be divided into the common network slices and the dedicated network slices in a master base station as well as the common network slices and the dedicated network slices in a secondary base station. After the RAN slices are determined, network functions and network resource configuration respectively corresponding to the RAN slices are determined accordingly. Here, the end-to-end in the network slice end-to-end correspondence usually refers to from a network source node that generates traffic data to a network end node that receives the traffic data.

In step S202, the master base station collects statistics on slice identifiers (Slice IDs) or multiple dimension descriptor (MDD) information reported by all user equipments (UEs) served by the master base station, and obtains quantity of slice resources needed to be allocated to construct RAN slices by the master base station. The quantity of slice resources includes a radio physical resource, a baseband processing resource and a network transmission resource.

The master base station is operative to speculate, according to the Slice IDs or MDD information reported by all UEs, ideal quantity of slice resources needed to be allocated to construct each RAN slice. For example, in a certain period, the master base station eNB finds that there are many eMBB-type traffic UEs it serves, and resources of the eNB are under great pressure. However, the secondary base station gNB1 finds that there are few URLLC-type traffic UEs it serves, i.e., most resources of the DSA3 slice are in an idle state; and the secondary base station gNB2 finds that there are few mMTC-type traffic UEs it serves, i.e., most resources of the DSA6 slice are in the idle state.

In step S203, the master base station transmits, according to the quantity of slice resources needed to be allocated to construct the RAN slices by the master base station, reconstruction request information of a RAN slice to the neighboring secondary base station.

Figure 8:
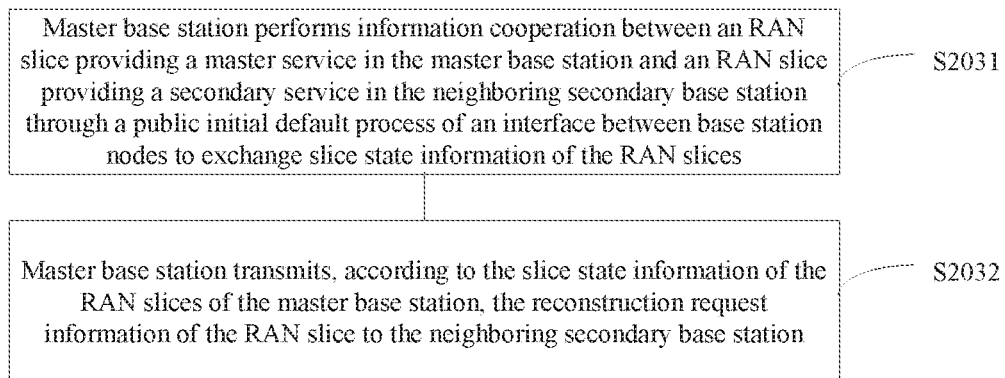
FIG. 8 is a flowchart two of a radio access network slice construction method of a multi-connection data transmission according to embodiment three of the present disclosure.

Referring to FIG. 8, the step S203 may include steps S2031 and S2032 described below.

In step S2031, the master base station performs information cooperation between an RAN slice providing a master service in the master base station and an RAN slice providing a secondary service in the neighboring secondary base station through a public initial default process of an interface between base station nodes to exchange slice state information of the RAN slices. The slice state information includes a working state, a resource duty ratio and a congestion situation of each RAN slice.

In step S2032, the master base station transmits, according to the slice state information of the RAN slices of the master base station, the reconstruction request information of the RAN slice to the neighboring secondary base station.

The RAN base station nodes need to be notified each other and cooperate their own real-time RAN slice split and working states through a public initial default signaling process, including: RAN slice information currently configured in a certain base station node, whether the working state of each RAN slice is normal, a slice load state, a resource usage rate, and whether is operative to be the RAN slice providing the secondary service for a neighboring master base station. At the time of transmitting the reconstruction request, the master base station also transmits the relevant Slice IDs or MDD information of all UEs and having statistically summarized by the master base station itself, or the relevant Slice IDs or MDD information of a single UE to the neighboring secondary base station as reference through a public initial default process message.

In step S204, the master base station performs, according to reconstruction response information of the RAN slice received from the neighboring secondary base station, multi-connection data transmission reconfiguration on the UEs served by the master base station through a radio resource control (RRC) message. The reconstruction response information includes information about reconfiguration by the neighboring secondary base station of the RAN slices within the neighboring secondary base station according to the reconstruction request information of the RAN slice.

The master base station performs, according to common initial default process feedback of the neighboring secondary base station, a multi-connection construction operation on the UEs that are not yet in the multi-connection data transmission operation through air interface message RRC, so that more UEs are in a better multi-connection data transmission state. At the same time, more traffic data with strained resources of the UEs that are already in the multi-connection data transmission operation are offloaded to the neighboring secondary base station.

The embodiments of the present disclosure provide a radio access network slice construction method for the multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

Embodiment Four

Figure 9:
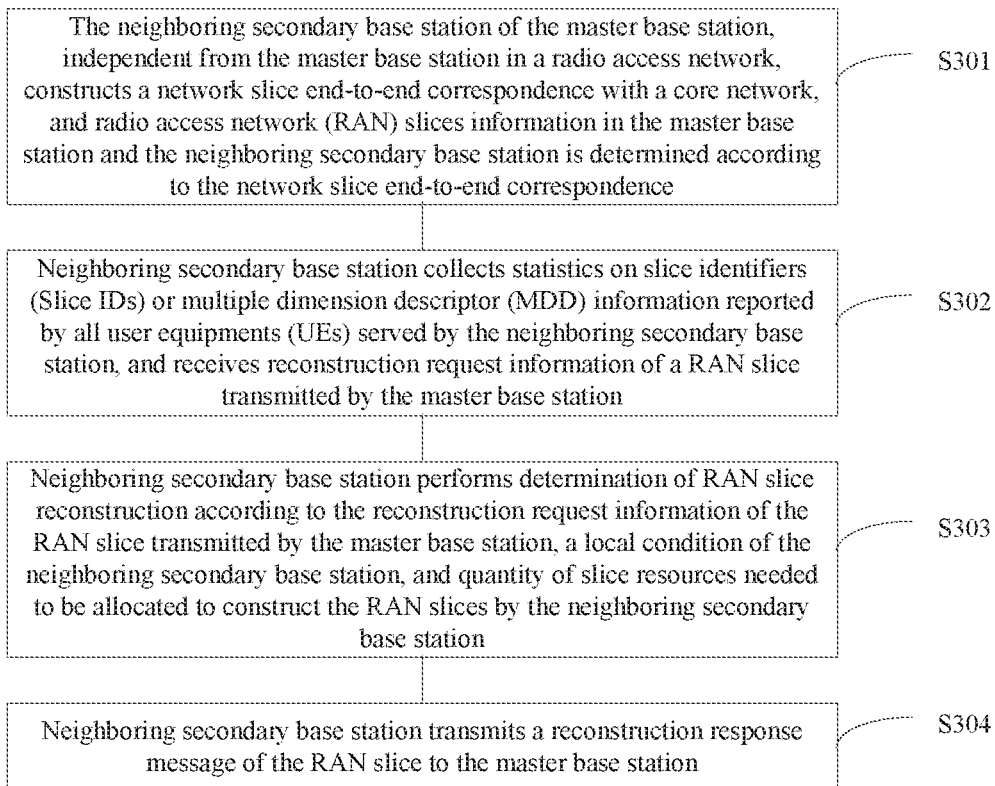
FIG. 9 is a flowchart one of a radio access network slice construction method of a multi-connection data transmission according to embodiment four of the present disclosure.

Referring to FIG. 9, embodiments of the present disclosure provide a radio access network slice construction method, applied to a neighboring secondary base station of a master base station in a radio access network. The method includes steps described below.

In step S301, each of the neighboring secondary base station of the master base station and the master base station in a radio access network constructs a network slice end-to-end correspondence with a core network, and according to the network slice end-to-end correspondence, radio access network (RAN) slices information in the master base station and the neighboring secondary base station is determined.

It is to be understood that RAN slices may be divided into common and dedicated network slices. And the RAN slices are operative to be divided into the common network slices and the dedicated network slices in the master base station as well as the common network slices and the dedicated network slices in the secondary base station. After the RAN slices are determined, network functions and network resource configuration respectively corresponding to the RAN slices are determined accordingly.

In step S302, the neighboring secondary base station collects statistics on slice identifiers (Slice IDs) or multiple dimension descriptor (MDD) information reported by all user equipments (UEs) served by the neighboring secondary base station, and receives reconstruction request information of a RAN slice transmitted by the master base station.

Figure 10:
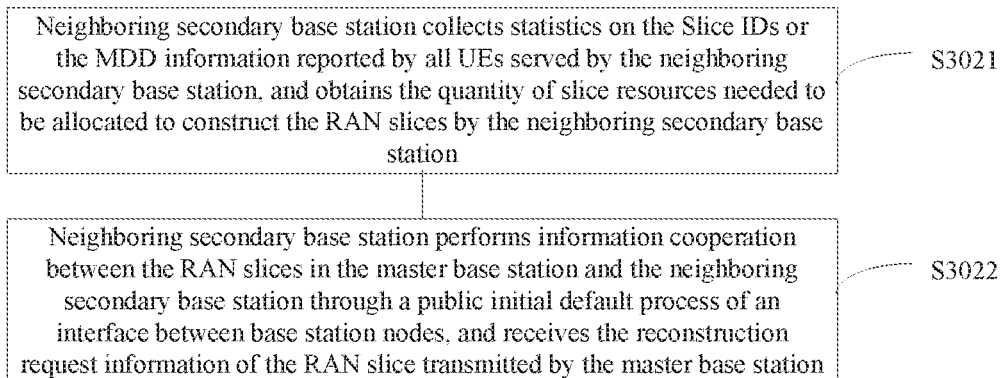
FIG. 10 is a flowchart two of a radio access network slice construction method of a multi-connection data transmission according to embodiment four of the present disclosure.

Referring to FIG. 10, the step S302 may include steps S3021 and S3022 described below.

In step S3021, the neighboring secondary base station collects statistics on the Slice IDs or the MDD information reported by all UEs served by the neighboring secondary base station, and obtains the quantity of slice resources needed to be allocated to construct the RAN slices by the neighboring secondary base station.

In step S3022, the neighboring secondary base station performs information cooperation between the RAN slices in the master base station and the neighboring secondary base station through a public initial default process of an interface between base station nodes, and receives the reconstruction request information of the RAN slice transmitted by the master base station.

Figure 11:
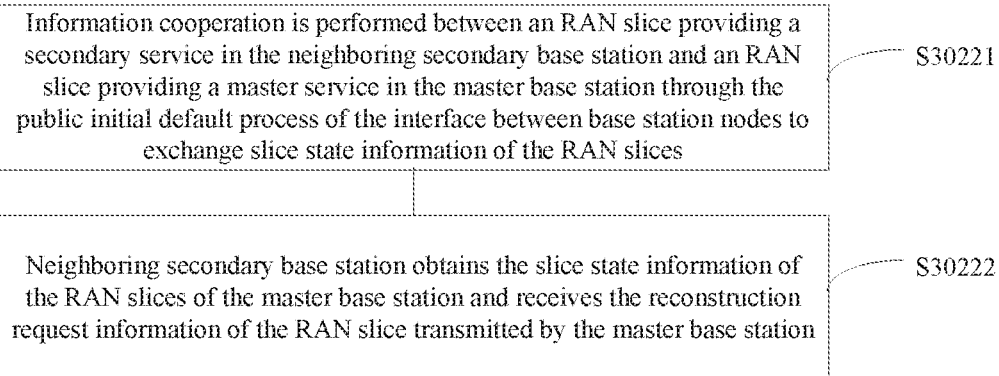
FIG. 11 is a flowchart three of a radio access network slice construction method of a multi-connection data transmission according to embodiment four of the present disclosure.

Referring to FIG. 11, the step S3022 includes steps S30221 and S30222 described below.

In step S30221, the information cooperation between an RAN slice providing a secondary service in the neighboring secondary base station and an RAN slice providing a master service in the master base station is performed through the public initial default process of the interface between base station nodes to exchange slice state information of the RAN slices.

In step S30222, the neighboring secondary base station obtains the slice state information of the RAN slices of the master base station and receives the reconstruction request information of the RAN slice transmitted by the master base station.

The neighboring secondary base stations statistically summarize the relevant Slice IDs or MDD information of all UEs served by the neighboring secondary base stations, and ideal quantity of slice resources needed to be allocated to construct each RAN slice is operative to be speculated.

In step S303, the neighboring secondary base station performs determination of RAN slice reconstruction according to the reconstruction request information of the RAN slice transmitted by the master base station, a local condition of the neighboring secondary base station, and quantity of slice resources needed to be allocated to construct the RAN slices by the neighboring secondary base station. The quantity of slice resources includes a radio physical resource, a baseband processing resource and a network transmission resource.

Figure 12:
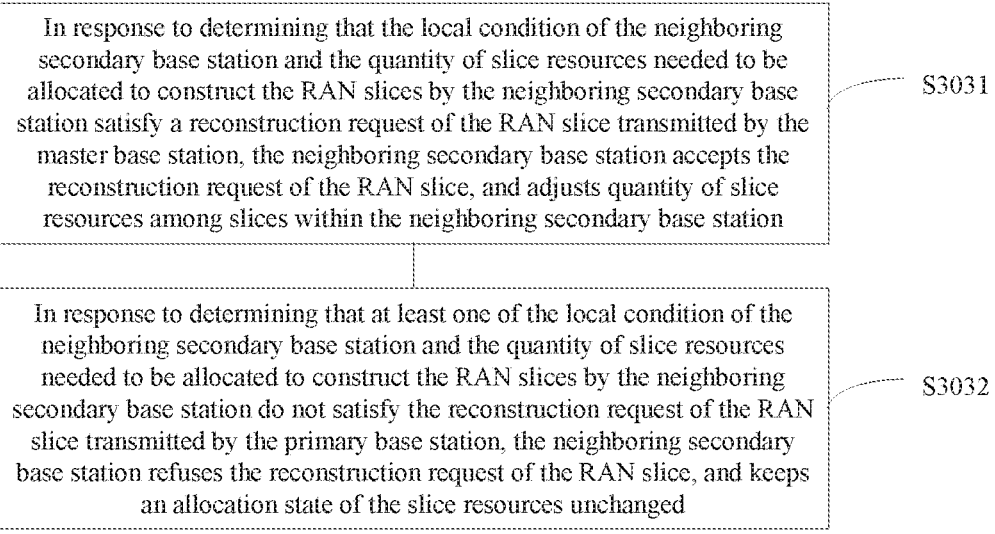
FIG. 12 is a flowchart four of a radio access network slice construction method of a multi-connection data transmission according to embodiment four of the present disclosure.

Referring to FIG. 12, the step S303 may include steps S3031 and S3032 described below.

In step S3031, in response to determining that the local condition of the neighboring secondary base station and the quantity of slice resources needed to be allocated to construct the RAN slices by the neighboring secondary base station satisfy a reconstruction request of the RAN slice transmitted by the master base station, the neighboring secondary base station accepts the reconstruction request of the RAN slice, and adjusts quantity of slice resources among slices within the neighboring secondary base station.

In step S3032, in response to determining that at least one of the local condition of the neighboring secondary base station and the quantity of slice resources needed to be allocated to construct the RAN slices by the neighboring secondary base station do not satisfy the reconstruction request of the RAN slice transmitted by the primary base station, the neighboring secondary base station refuses the reconstruction request of the RAN slice, and keeps an allocation state of the slice resources unchanged.

The neighboring secondary base station performs, according to the reconstruction request of the RAN slice of the master base station, other local conditions, determination and operation of the RAN Slice for the master and secondary service. In response to determining that at least one of the local condition of the neighboring secondary base station and the quantity of slice resources needed to be allocated to construct the RAN slices by the neighboring secondary base station satisfy the reconstruction request of the RAN slice transmitted by the primary base station, the neighboring secondary base station accepts the reconstruction request of the RAN slice and readjusts the quantity of slice resources among the slices within the neighboring secondary base station. In response to determining that at least one of the local condition of the neighboring secondary base station and the quantity of slice resources needed to be allocated to construct the RAN slices by the neighboring secondary base station do not satisfy the reconstruction request of the RAN slice transmitted by the primary base station, the neighboring secondary base station refuses the reconstruction request of the RAN slice transmitted by the primary base station, and keeps an allocation state of the slice resources unchanged. Here, the local condition of the neighboring secondary base station includes the current division, whether the working state is normal, the load state and the resource usage rate of each RAN slice.

In step S304, the neighboring secondary base station transmits a reconstruction response message of the RAN slice to the master base station.

It is to be understood that after performing the determination of RAN slice reconstruction, the neighboring secondary base station feeds back the message to the master base station by the public initial default process. The master base station is operative to perform multi-connection data transmission configuration on the UEs according to the determination of RAN slice reconstruction.

The embodiments of the present disclosure provide a radio access network slice construction method for the multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

Embodiment Five

Figure 13:
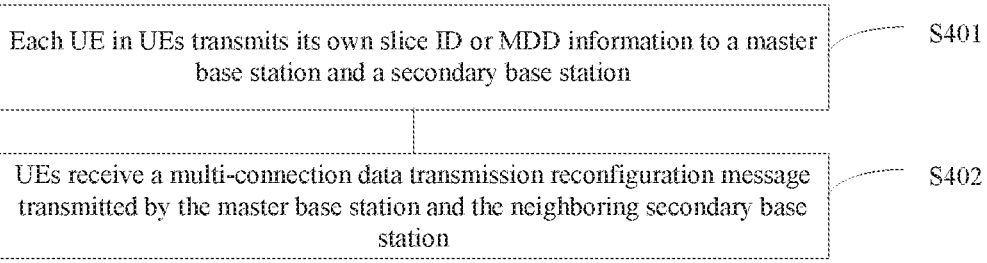
FIG. 13 is a flowchart of a radio access network slice construction method of a multi-connection data transmission provided by embodiment five according to the present disclosure.

Referring to FIG. 13, embodiments of the present disclosure provide a radio access network slice construction method, applied to UEs. The method includes steps described below.

In step S401, each UE in UEs transmits its own slice ID or MDD information to a master base station and a secondary base station.

Types of traffic UE are operative to be described by MDD attributes and include: tenant user information, slice information (a slice type and/or a slice identifier), traffic information (a traffic type and/or quality of experience (QoE) and/or quality of service (QoS), an application ID) or ID information used and customized by the operator. A network is operative to configure, according to a MDD value, different processing strategy and parameter set. Slice ID information also reflects the slice information in the master base station and the neighboring secondary base station.

In step S402, the UEs receive a multi-connection data transmission reconfiguration message transmitted by the master base station and the neighboring secondary base station.

It is to be understood that the master base station performs multi-connection data transmission configuration on the UEs to enable the UEs served by the master base station to obtain a better data transmission effect.

The embodiments of the present disclosure provide a radio access network slice construction method for the multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

Embodiment Six

Figure 14:
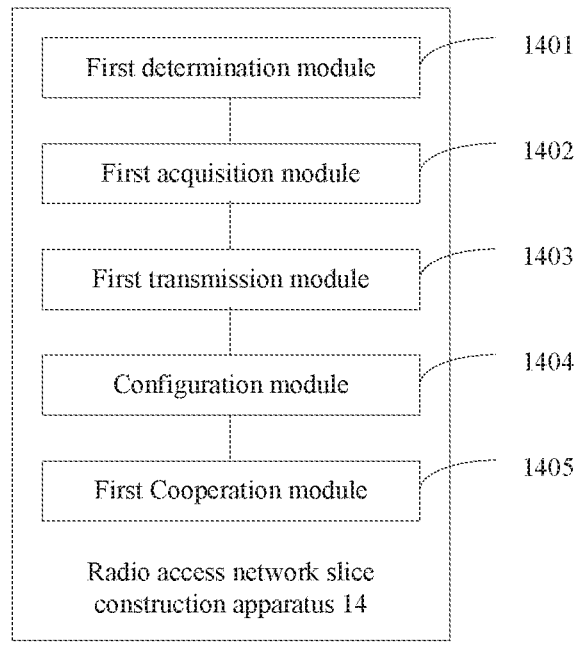
FIG. 14 is a structural diagram of a radio access network slice construction apparatus of a multi-connection data transmission according to embodiment six of the present disclosure.

Referring to FIG. 14, a radio access network slice construction apparatus 14 further provided by embodiments of the present disclosure is shown. The apparatus 14 is applied to a master base station in a radio access network (RAN). The apparatus includes: a first determination module 1401, a first acquisition module 1402, a first transmission module 1403 and a configuration module 1404.

The first determination module 1401 is configured to construct, independently from a neighboring secondary base station, a network slice end-to-end correspondence with a core network, and determine, according to the network slice end-to-end correspondence, RAN slices information in the master base station and the neighboring secondary base station.

The first acquisition module 1402 is configured to collect statistics on Slice IDs or MDD information reported by all UEs served by the master base station, and obtain quantity of slice resources needed to be allocated to construct RAN slices by the master base station. The quantity of slice resources comprises a radio physical resource, a baseband processing resource and a network transmission resource.

The first transmission module 1403 is configured to transmit, according to the quantity of slice resources needed to be allocated to construct the RAN slices by the master base station, reconstruction request information of a RAN slice to the neighboring secondary base station.

The configuration module 1404 is configured to perform, according to reconstruction response information of the RAN slice received from the neighboring secondary base station, multi-connection data transmission reconfiguration on the UEs served by the master base station through a radio resource control (RRC) message. The reconstruction response information includes information about reconfiguration, by the neighboring secondary base station of the RAN slices within the neighboring secondary base station, according to the reconstruction request information of the RAN slice.

Furthermore, the apparatus further includes: a first cooperation module 1405, which is configured to perform information cooperation between an RAN slice providing a master service in the master base station and an RAN slice providing a secondary service in the neighboring secondary base station through a common initial default process of an interface between base station nodes to exchange slice state information of the RAN slices. The slice state information includes a working state, a resource duty ratio and a congestion situation of each RAN slice.

The first transmission module 1403 is configured to transmit, according to the slice state information of the RAN slices of the master base station, the reconstruction request information of the RAN slice to the neighboring secondary base station.

The description of the radio access network slice construction apparatus of the multi-connection data transmission applied to the master base station in the RAN may refer to the description of the radio access network slice construction method of the multi-connection data transmission in the embodiment three and will not be described here again.

In practice, the first determination module 1401, the first acquisition module 1402, the first transmission module 1403, the configuration module 1404 and the first cooperation module 1405 may all be implemented by a Central Processing Unit (CPU), a Micro Processor Unit (MPU), a Digital Signal Processor (DSP), or a Field Programmable Gate Array (FPGA) located in the radio access network slice construction apparatus 14 of the multi-connection data transmission.

The embodiments of the present disclosure provide a radio access network slice construction apparatus for the multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

Embodiment Seven

Figure 15:
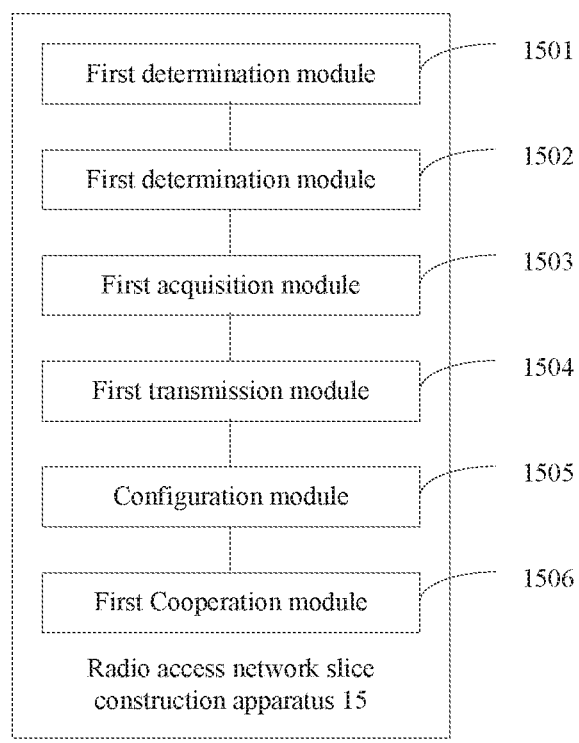
FIG. 15 is a structural diagram of a radio access network slice construction apparatus of a multi-connection data transmission according to embodiment seven of the present disclosure.

Referring to FIG. 15, a radio access network slice construction apparatus 15 further provided by embodiments of the present disclosure is shown. The apparatus 15 is applied to a neighboring secondary base station of a master base station in a radio access network. The apparatus includes. The apparatus includes: a second determination module 1501, a reception module 1502, a determining module 1503 and a second transmission module 1504.

The second determination module 1501 is configured to construct, independently from the master base station, a network slice end-to-end correspondence, and determine, according to the network slice end-to-end correspondence, radio access network (RAN) slices information in the master base station and the neighboring secondary base station.

The reception module 1502 is configured to collect statistics on slice IDs or MDD information reported by all UEs served by the neighboring secondary base station, and receive reconstruction request information of a RAN slice transmitted by the master base station.

The determining module 1503 is configured to perform, determination of RAN slice reconstruction according to the reconstruction request information of the RAN slice transmitted by the master base station, a local condition of the neighboring secondary base station, and quantity of slice resources needed to be allocated to construct the RAN slices by the neighboring secondary base station. The quantity of slice resources includes a radio physical resource, a baseband processing resource and a network transmission resource.

The second transmission module 1504 is configured to transmit a reconstruction response message of the RAN slice to the master base station.

Furthermore, the apparatus further includes a second acquisition module 1505 and a second cooperation module 1506.

The second acquisition module 1505 is configured to collect statistics on Slice IDs or MDD information reported by all UEs served by the neighboring secondary base station, and obtain the quantity of slice resources needed to be allocated to construct the RAN slices by the neighboring secondary base station.

The second cooperation module 1506 is configured to perform information cooperation with the RAN slices in the master base station through a public initial default process of an interface between base station nodes.

The reception module 1502 is configured to receive the reconstruction request information of the RAN slice transmitted by the master base station.

Furthermore, the second cooperation module 1506 is configured to perform information cooperation between an RAN slice providing a secondary service in the neighboring secondary base station and an RAN slice providing a master service in the master base station through the public initial default process of the interface between the base station nodes to exchange slice state information of the RAN slices.

The reception module 1502 is configured to obtain the slice state information of the RAN slices of the master base station and receive the reconstruction request information of the RAN slice transmitted by the master base station.

Furthermore, the determining module 1503 is configured to accept a reconstruction request of the RAN slice in response to determining that the local condition of the neighboring secondary base station and the quantity of slice resources needed to be allocated to construct the RAN slices by the neighboring secondary base station satisfy the reconstruction request of the RAN slice transmitted by the master base station; and refuse the reconstruction request of the RAN slice and keep an allocation state of the slice resources unchanged in response to determining that at least one of local condition of the neighboring secondary base station and the quantity of slice resources needed to be allocated to construct the RAN slices by the neighboring secondary base station do not satisfy the reconstruction request of the RAN slice transmitted by the master base station.

The description of the radio access network slice construction apparatus of the multi-connection data transmission applied to the neighboring secondary base station of the master base station may refer to the description of the radio access network slice construction method of the multi-connection data transmission in the embodiment four and will not be described here again.

In practice, the second determination module 1501, the reception module 1502, the determining module 1503, the second transmission module 1504, the second acquisition module 1505 and the second cooperation module 1506 may all be implemented by a CPU, a MPU, a DSP, or a FPGA located in the radio access network slice construction apparatus 15 of the multi-connection data transmission.

The embodiments of the present disclosure provide a radio access network slice construction apparatus for a multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

The embodiments of the present disclosure further provide a computer-readable storage medium configured to store computer-executable instructions for executing a radio access network slice selection method described in FIGS. 7 and 8 when executed by a processor. The embodiments of the present disclosure further provide a computer-readable storage medium configured to store computer-executable instructions for executing a radio access network slice selection method described from FIGS. 9 to 13 when executed by a processor.

It should be understood by those skilled in the art that the embodiments of the present disclosure may be provided as methods, systems or computer program products. Therefore, the embodiments of the present application may be implemented by hardware, software, or a combination of hardware and software. The embodiments of the present disclosure may take the form of a computer program product implemented on one or more computer-usable storage media (including, but not limited to, a disk memory and an optical memory) that includes computer-usable program codes.

The present application is described with reference to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of another programmable data processing device to produce a machine so that instructions executed by a computer or a processor of another programmable data processing device produce an apparatus for implementing the functions specified in one or more flows in the flowcharts and/or one or more blocks in the block diagrams.

These computer program instructions can also be stored in a computer-readable memory which can direct a computer or other programmable data processing devices to operate in a particular manner so that the instructions stored in the computer-readable memory produce a manufactured product including an instruction apparatus. The instruction apparatus implements the functions specified in one or more flows in the flowcharts and/or one or more blocks in the block diagrams.

These computer program instructions can also be loaded onto a computer or other programmable data processing devices so that a series of operation steps are performed on the computer or other programmable devices to produce processing implemented by a computer. Therefore, instructions executed on a computer or other programmable devices provide steps for implementing the functions specified in one or more flows in the flowcharts and/or one or more blocks in the block diagrams.

The above are merely embodiments of the present disclosure and are not intended to limit the protection scope of the present application.

INDUSTRIAL APPLICABILITY

The embodiments of the present disclosure provide a radio access network slice construction method and apparatus for multi-connection data transmission. The master base station transmits, according to information reported by the UEs, network slice reconstruction information to the neighboring secondary base station, and enables the UEs to perform the multi-connection data transmission through the neighboring secondary base station, thereby better adapting to UE types, users as well as traffic characteristics and obtaining a better data transmission effect.

What is claimed is:

1. A radio access network slice construction method, applied to a master base station in a radio access network (RAN), comprising:

constructing, by the master base station independent from at least one neighboring secondary base station in the RAN, a network slice end-to-end correspondence with a core network, and determining, according to the network slice end-to-end correspondence, RAN slices information in the master base station and the neighboring secondary base station;

collecting statistics, by the master base station, on slice identifiers (Slice IDs) or multiple dimension descriptor (MDD) information reported by all user equipments (UEs) served by the master base station, and obtaining quantity of slice resources needed to be allocated to construct RAN slices by the master base station; wherein the quantity of slice resources comprises a radio physical resource, a baseband processing resource and a network transmission resource;

transmitting, by the master base station, according to the quantity of slice resources needed to be allocated to construct the RAN slices by the master base station, reconstruction request information of a RAN slice to the neighboring secondary base station; and performing, by the master base station, according to reconstruction response information of the RAN slice received from the neighboring secondary base station, multi-connection data transmission reconfiguration on the UEs served by the master base station through a radio resource control (RRC) message; wherein the reconstruction response information comprises information about reconfiguration by the neighboring secondary base station of the RAN slices within the neighboring secondary base station according to the reconstruction request information of the RAN slice.

2. The method of claim 1, wherein transmitting, by the master base station, according to the quantity of slice resources needed to be allocated to construct the RAN slices by the master base station, reconstruction request information of the RAN slice to the neighboring secondary base station comprises:

performing, by the master base station, information cooperation between an RAN slice providing a master service in the master base station and an RAN slice providing a secondary service in the neighboring secondary base station through a common initial default process of an interface between base station nodes to exchange slice state information of the RAN slices; wherein the slice state information comprises a working state, a resource duty ratio and a congestion situation of each RAN slice; and transmitting, by the master base station, according to the slice state information of the RAN slices of the master base station, the reconstruction request information of the RAN slice to the neighboring secondary base station.

3. A multi-radio access network slice construction method, applied to a neighboring secondary base station of a master base station in a radio access network, comprising:

constructing, by the neighboring secondary base station of the master base station independent from the master base station in a radio access network, a network slice end-to-end correspondence with a core network, and determining, according to the network slice end-to-end correspondence, radio access network (RAN) slices information in the master base station and the neighboring secondary base station;

collecting statistics, by the neighboring secondary base station, on slice identifiers (Slice IDs) or multiple dimension descriptor (MDD) information reported by all user equipments (UEs) served by the neighboring secondary base station, and receiving reconstruction request information of a RAN slice transmitted by the master base station;

performing, by the neighboring secondary base station, determination of RAN slice reconstruction according to the reconstruction request information of the RAN slice transmitted by the master base station, a local condition of the neighboring secondary base station, and quantity of slice resources needed to be allocated to construct the RAN slices by the neighboring secondary base station; wherein the quantity of slice resources comprises a radio physical resource, a baseband processing resource and a network transmission resource; and transmitting, by the neighboring secondary base station, a reconstruction response message of the RAN slice to the master base station.

4. The method of claim 3, wherein collecting statistics, by the neighboring secondary base station, on the slice IDs or the MDD information reported by the all UEs served by the neighboring secondary base station, and receiving reconstruction request information of the RAN slice transmitted by the master base station comprises:

collecting statistics, by the neighboring secondary base station, on the Slice IDs or the MDD information reported by all UEs served by the neighboring secondary base station, and obtaining the quantity of slice resources needed to be allocated to construct the RAN slices by the neighboring secondary base station; and performing, by the neighboring secondary base station, information cooperation between the RAN slices in the master base station and the neighboring secondary base station through a common initial default process of an interface between base station nodes, and receiving the reconstruction request information of the RAN slice transmitted by the master base station.

5. The method of claim 4, wherein performing, by the neighboring secondary base station, the information cooperation between the RAN slices in the master base station and the neighboring secondary base station through the common initial default process of the interface between base station nodes, and receiving the reconstruction request information of the RAN slice transmitted by the master base station comprises:

performing, by the neighboring secondary base station, the information cooperation between an RAN slice providing a secondary service in the neighboring secondary base station and an RAN slice providing a master service in the master base station through the common initial default process of the interface between base station nodes to exchange slice state information of the RAN slices; and obtaining, by the neighboring secondary base station, the slice state information of the RAN slices of the master base station and receiving the reconstruction request information of the RAN slice transmitted by the master base station.

6. The method of claim 3, wherein performing, by the neighboring secondary base station, the determination of RAN slice reconstruction according to the reconstruction request information of the RAN slice transmitted by the master base station, the local condition of the neighboring secondary base station, and the quantity of slice resources needed to be allocated to construct the RAN slices by the neighboring secondary base station comprises:
- in response to determining that the local condition of the neighboring secondary base station and the quantity of slice resources needed to be allocated to construct the RAN slices by the neighboring secondary base station satisfy a reconstruction request of the RAN slice transmitted by the master base station, accepting, by the neighboring secondary base station, the reconstruction request of the RAN slice and adjusting quantity of slice resources among slices within the neighboring secondary base station; and
- in response to determining that at least one of the local condition of the neighboring secondary base station and the quantity of slice resources needed to be allocated to construct the RAN slices by the neighboring secondary base station do not satisfy the reconstruction request of the RAN slice transmitted by the primary base station, refusing, by the neighboring secondary base station, the reconstruction request of the RAN slice, and keeping an allocation state of the slice resources unchanged.

7. A radio access network slice construction apparatus, applied to a master base station in a radio access network (RAN), comprising:
- a processor; and
- a memory for storing instructions executable by the processor, wherein the processor is configured to:
- construct, independently from at least one neighboring secondary base station, a network slice end-to-end correspondence with a core network, and determine, according to the network slice end-to-end correspondence, RAN slices information in the master base station and the neighboring secondary base station;
- collect statistics on slice identifiers (Slice IDs) or multiple dimension descriptor (MDD) information reported by all user equipments (UEs) served by the master base station, and obtain, quantity of slice resources needed to be allocated to construct RAN slices by the master base station; wherein the quantity of slice resources comprises a radio physical resource, a baseband processing resource and a network transmission resource;
- transmit, according to the quantity of slice resources needed to be allocated to construct the RAN slices by the master base station, reconstruction request information of a RAN slice to the neighboring secondary base station; and
- perform, according to reconstruction response information of the RAN slice received from the neighboring secondary base station, multi-connection data transmission reconfiguration on the UEs served by the master base station through a radio resource control (RRC) message; wherein the reconstruction response information comprises information about reconfiguration, by the neighboring secondary base station of the RAN slices within the neighboring secondary base station, according to the reconstruction request information of the RAN slice.

8. The apparatus of claim 7, wherein the processor is further configured to
- perform information cooperation between an RAN slice providing a master service in the master base station and an RAN slice providing a secondary service in the neighboring secondary base station, through a common initial default process of an interface between base station nodes to exchange slice state information of the RAN slices; wherein the slice state information comprises a working state, a resource duty ratio and a congestion situation;

wherein processor is configured to transmit, according to the slice state information of the RAN slices of the master base station, the reconstruction request information of the RAN slice to the neighboring secondary base station.

9. A radio access network slice construction apparatus, applied to a neighboring secondary base station of a master base station in a radio access network, comprising:
- a processor; and
- a memory for storing instructions executable by the processor,
- wherein the processor is configured to implement the multi-radio access network slice construction method of claim 3.

10. The apparatus of claim 9, wherein the processor is further configured to:
- collect statistics on Slice IDs or MDD information reported by all UEs served by the neighboring secondary base station, and obtain the quantity of slice resources needed to be allocated to construct the RAN slices by the neighboring secondary base station;
- perform information cooperation with the RAN slices in the master base station through a common initial default process of an interface between base station nodes; and wherein the processor is configured to receive the reconstruction request information of the RAN slice transmitted by the master base station.

11. The apparatus of claim 10, wherein the processor is configured to:
- perform information cooperation between an RAN slice providing a secondary service in the neighboring secondary base station and an RAN slice providing a master service in the master base station through the common initial default process of the interface between the base station nodes to exchange slice state information of the RAN slices; and
- obtain the slice state information of the RAN slices of the master base station and receive the reconstruction request information of the RAN slices transmitted by the master base station.

12. The apparatus of claim 9, wherein the processor is configured to:
- accept a reconstruction request of the RAN slice in response to determining that the local condition of the neighboring secondary base station and the quantity of slice resources needed to be allocated to construct the RAN slices by the neighboring secondary base station satisfy the reconstruction request of the RAN slice transmitted by the master base station; and
- refuse the reconstruction request of the RAN slice and keep an allocation state of the slice resources unchanged in response to determining that at least one of local condition of the neighboring secondary base station and the quantity of slice resources needed to be allocated to construct the RAN slices by the neighboring secondary base station do not satisfy the reconstruction request of the RAN slice transmitted by the master base station.

13. A computer-readable storage medium, which is configured to store computer-executable instructions for executing a radio access network slice selection method of claim 1.

14. A computer-readable storage medium, which is configured to store computer-executable instructions for executing a radio access network slice selection method of claim 3.

15. The computer-readable storage medium of claim 13, wherein transmitting, by the master base station, according to the quantity of slice resources needed to be allocated to construct the RAN slices by the master base station, reconstruction request information of the RAN slice to the neighboring secondary base station comprises:
- performing, by the master base station, information cooperation between an RAN slice providing a master service in the master base station and an RAN slice providing a secondary service in the neighboring secondary base station through a common initial default process of an interface between base station nodes to exchange slice state information of the RAN slices; wherein the slice state information comprises a working state, a resource duty ratio and a congestion situation of each RAN slice; and
- transmitting, by the master base station, according to the slice state information of the RAN slices of the master base station, the reconstruction request information of the RAN slice to the neighboring secondary base station.

16. The computer-readable storage medium of claim 14, wherein collecting statistics, by the neighboring secondary base station, on the slice IDs or the MDD information reported by the all UEs served by the neighboring secondary base station, and receiving reconstruction request information of the RAN slice transmitted by the master base station comprises:
- collecting statistics, by the neighboring secondary base station, on the Slice IDs or the MDD information reported by all UEs served by the neighboring secondary base station, and obtaining the quantity of slice resources needed to be allocated to construct the RAN slices by the neighboring secondary base station; and
- performing, by the neighboring secondary base station, information cooperation between the RAN slices in the master base station and the neighboring secondary base station through a common initial default process of an interface between base station nodes, and receiving the reconstruction request information of the RAN slice transmitted by the master base station.

17. The computer-readable storage medium of claim 16, wherein performing, by the neighboring secondary base station, the information cooperation between the RAN slices in the master base station and the neighboring secondary base station through the common initial default process of the interface between base station nodes, and receiving the reconstruction request information of the RAN slice transmitted by the master base station comprises:
- performing, by the neighboring secondary base station, the information cooperation between an RAN slice providing a secondary service in the neighboring secondary base station and an RAN slice providing a master service in the master base station through the common initial default process of the interface between base station nodes to exchange slice state information of the RAN slices; and
- obtaining, by the neighboring secondary base station, the slice state information of the RAN slices of the master base station and receiving the reconstruction request information of the RAN slice transmitted by the master base station.

18. The computer-readable storage medium of claim 14, wherein performing, by the neighboring secondary base station, the determination of RAN slice reconstruction according to the reconstruction request information of the RAN slice transmitted by the master base station, the local condition of the neighboring secondary base station, and the quantity of slice resources needed to be allocated to construct the RAN slices by the neighboring secondary base station comprises:
- in response to determining that the local condition of the neighboring secondary base station and the quantity of slice resources needed to be allocated to construct the RAN slices by the neighboring secondary base station satisfy a reconstruction request of the RAN slice transmitted by the master base station, accepting, by the neighboring secondary base station, the reconstruction request of the RAN slice and adjusting quantity of slice resources among slices within the neighboring secondary base station; and
- in response to determining that at least one of the local condition of the neighboring secondary base station and the quantity of slice resources needed to be allocated to construct the RAN slices by the neighboring secondary base station do not satisfy the reconstruction request of the RAN slice transmitted by the primary base station, refusing, by the neighboring secondary base station, the reconstruction request of the RAN slice, and keeping an allocation state of the slice resources unchanged.

* * * * *